United States Patent [19]

Juskevic

[11] 4,188,163

[45] Feb. 12, 1980

[54] KEY DUPLICATING MACHINE

[76] Inventor: John Juskevic, c/o Penne Products Corporation, 18454 Fitzpatrick, Detroit, Mich. 48228

[21] Appl. No.: 926,931

[22] Filed: Jul. 21, 1978

[51] Int. Cl.² .............................................. B23C 1/16
[52] U.S. Cl. ........................................ 409/82; 76/110; 409/81
[58] Field of Search .................... 90/13.05; 76/110; 51/100 R

[56] References Cited

U.S. PATENT DOCUMENTS

| | | | |
|---|---|---|---|
| 969,702 | 9/1910 | Johnson | 90/13.05 |
| 1,889,461 | 11/1932 | Hansen | 90/13.05 |
| 1,923,164 | 8/1933 | Roos | 90/13.05 |
| 2,038,949 | 4/1936 | Mintz | 90/13.05 |
| 3,011,411 | 12/1961 | Raymond | 90/13.05 |
| 3,440,906 | 4/1969 | Allen | 76/110 |
| 3,791,240 | 2/1974 | Meoni | 76/110 |
| 3,919,920 | 11/1975 | Schlage | 90/13.05 |

FOREIGN PATENT DOCUMENTS 1209847  1/1966  Fed. Rep. of Germany ............. 76/110

*Primary Examiner*—William R. Briggs

[57] ABSTRACT

A machine for cutting a key blank edge into a duplicate, predetermined key edge shape, which shape is identified by a code. The blank is clamped within a vise mounted upon one end of an elongated lever which has a stylus mounted upon its opposite end and is centrally journalled upon a fixed shaft for sliding movement along the shaft and for rocking about the shaft. A guide is positioned adjacent the stylus so that as the lever is moved along the shaft, the stylus contacts and moves upon the guide surface in a path parallel to the shaft. The guide surface is formed by clamping together in face to face relationship, a number of substantially identical, narrow, elongated, thin blades, each having a guide edge which is formed with successive steps of predetermined depth and length. One pre-selected step of each blade is aligned with the stylus path so that the aligned steps form the guide surface which, when contacted by the stylus, causes the lever to rock and to correspondingly move the key blank in a direction transversely to the shaft axis in a direction towards and away from a cutter wheel for thereby shaping the edge of the blank into the predesired key edge shape. The blade steps each correspond to a known coded depth of a portion of a key edge, so that a known key can be duplicated by appropriately positioning the blade steps.

4 Claims, 9 Drawing Figures

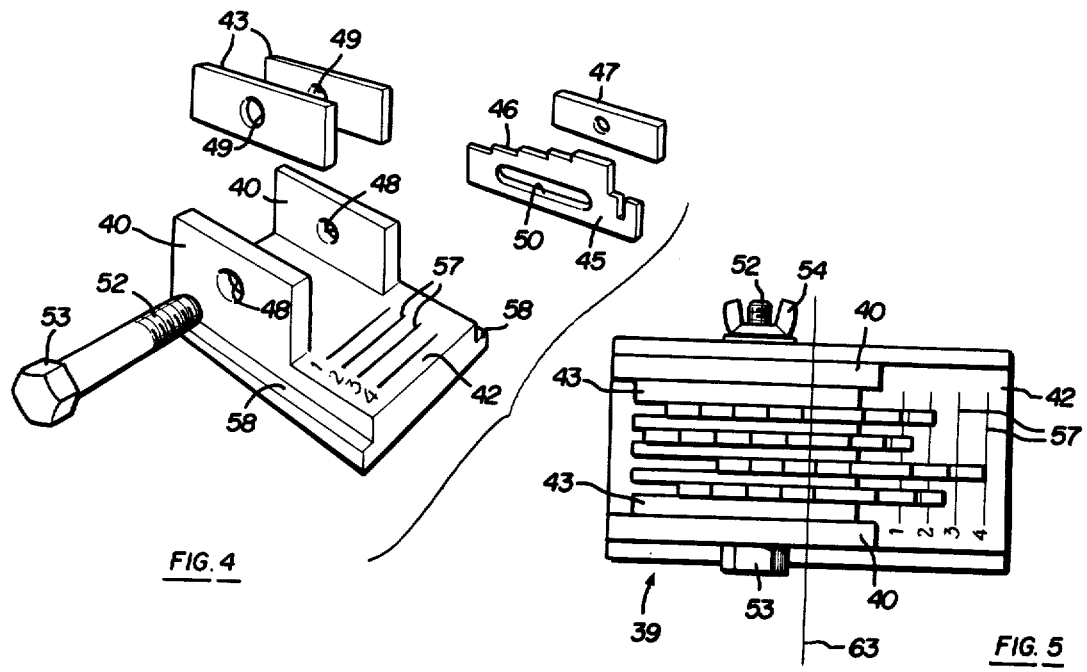
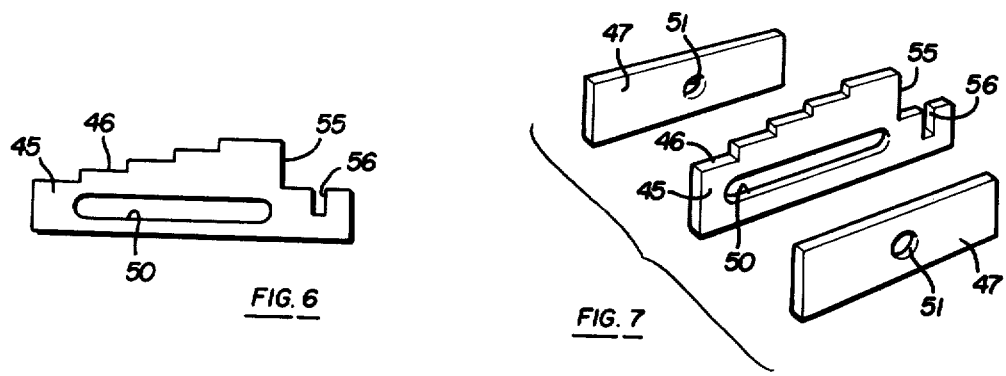
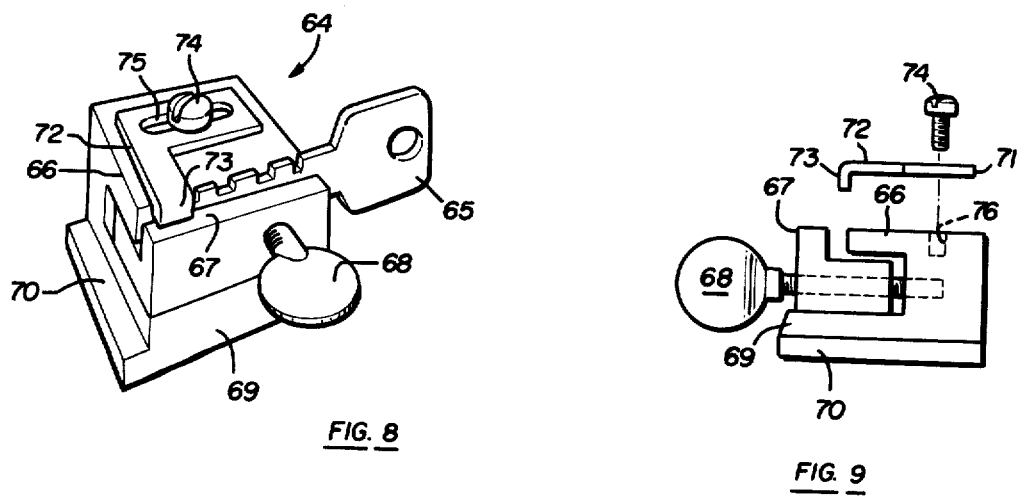

KEY DUPLICATING MACHINE

BACKGROUND OF INVENTION

Presently available key duplicating equipment for producing copies of existing keys, generally comprise a vise for holding the original key, a stylus for feeling the contoured edge of the key and an arm or lever of some sort guided by movement of the stylus. A key blank is secured in a vise adjacent the arm or lever and movement of the lever either moves the key blank into contact with a cutting wheel or alternatively, in some devices, moves the cutter relative to the fixed key blank. In either event, the movement of the stylus along the length of the original key and in and out relative to the originally formed valleys in the key edge, causes relative movement between the blank edge and the cutter to reproduce on the blank the same contours as appear on the original key.

A second way of producing duplicate keys is to produce them upon blanks based upon known information, i.e., the length and depth of the valleys and contoured edges of the key. This duplication is possible without the use of an original key. For example, the original key itself is commonly formed in this manner.

In the automotive industry, the automotive manufacturers use a pre-determined number of key forms to correspond to a pre-determined number of lock arrangements, as for example a thousand different forms. The keys are manufactured by using cutters or stamping dies based upon known depths and lengths of valleys in the key. These configured valleys or contours are coded. Hence, the manufacturer, and also the dealer, knowing the code of the particular lock installed in a vehicle, can provide duplicate keys to match that code number, which corresponds to the tumbler arrangement of the lock itself. Key duplicating equipment has been devised to reproduce keys from the known code numbered configurations, but such equipment has been complicated, expensive and generally impractical for widespread use on a sporadic basis, i.e., at an automobile dealer who might from time to time need to produce a duplicate key.

Hence, the invention herein is concerned with a key producing or duplicating machine whose purpose is to reproduce or duplicate keys either from existing key originals or alternatively from pre-known code numbered information relating to shapes of key edge configurations. The machine is of simple and inexpensive construction so that it may be used either in key reproducing shops, or in automotive dealer showrooms or shops, service facilities such as automotive clubs and the like who provide service calls, car rental agencies, hotels and the like where duplicate keys may be required from time to time and it is necessary to be able to reproduce the keys without having the original available.

DESCRIPTION OF INVENTION

The invention herein contemplates a key duplicating machine which is formed of a fixed shaft upon which is journalled a lever which is movable lengthwise of the shaft and may rock about the shaft axis. A stylus on one end of the lever is moved along and in contact with either an original key configured edge or alternatively a simulated or assembled key edge formed out of movable blades, each providing a particular valley or position on the key. The opposite end of the lever includes a vise for holding a key blank, above which is positioned a cutter wheel for cutting valleys or configured shapes upon the blank edge in response to movement of the stylus. A pair of guides is provided, one comprising a vise for holding an original key and the other a holder for movable blades for fabricating a simulated key edge from code.

The machine is simple in construction, embodying relatively few movable parts and can be easily operated manually. Alternatively it can be arranged for automatic or motor driven operation. Because of its simple and inexpensive construction, it can be made available at a low cost to shops which ordinarily would not have such equipment available, particularly for duplicating key blanks from a pre-determined code or known shape in the absence of the original key.

One object of this invention is to provide a dual purpose key duplicating machine which will operate to duplicate upon a key blank the contoured edge of an available original key or alternatively, with virtually no change in labor requirements, to reproduce a known key edge shape in the absence of the original key. Further, it is contemplated to make available sets of blades, each simulating a particular known or coded segment of a key, so that these blades may be interchanged to produce different kinds of keys, such as keys used in automobiles produced by different manufacturers.

These and other objects and advantages of this invention will become apparent upon reading the following description, of which the attached drawings form a part.

DESCRIPTION OF DRAWINGS

FIG. 4 is a perspective view of the guide and certain of the guide parts in disassembled relationship.

FIG. 5 is a top, plan view of the guide.

FIG. 6 is an elevational view of a guide blade, and

FIG. 7 is a perspective view of a guide blade located between adjacent shim or spacer plates.

FIG. 8 is a perspective view of a vise holding an original key to be duplicated, and FIG. 9 is a side, elevational view of the vise of FIG. 8, with the key removed and the key stop disassembled.

DETAILED DESCRIPTION

Figure 1:
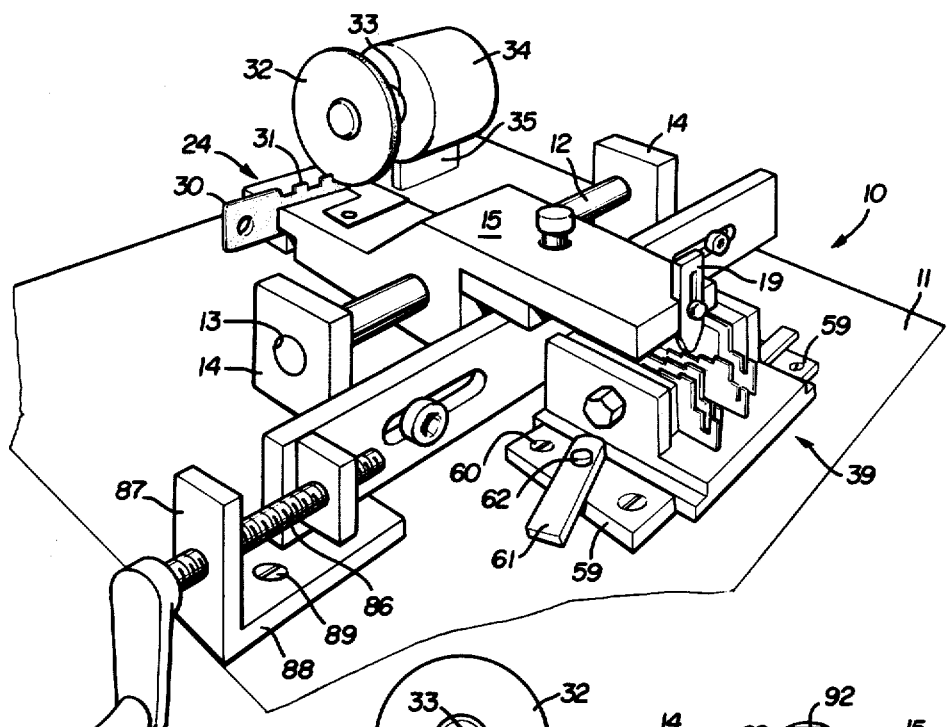
FIG. 1 is a perspective view of the key duplicating machine.

As shown in FIG. 1, the key duplicating machine 10 includes a table or base 11 upon which is positioned a horizontal shaft 12. The opposite ends of the shaft fit into openings 13 in brackets 14 which are secured to the table.

A lever 15 is mounted upon the shaft by means of a central, bearing forming opening 16 slidably and pivotally receiving the shaft. That is, the lever slides and pivots relative to the fixed shaft. One end of the lever is provided with a vertical channel or slot 17 within which a stylus 19 is positioned. The stylus which is generally in a flat, plate-like formation, is provided with an elongated slot 20 through which a screw 21 extends to threadedly engage a screw hole 22 in the base of the slot 17 (See FIG. 3).

The opposite end of the lever is provided with a key blank vise 24. The vise is formed of a fixed jaw 25 which is the end of the lever, and a movable jaw 26 shaped to slidably interengage with the fixed jaw and to be moved towards and away therefrom by means of a thumb screw 27 (See FIG. 2). The key blank 30 is placed within the vise so that its key shape edge 31 is exposed above the upper surface of the vise to a cutting wheel 32. The cutting wheel, which may be of any conventional key cutting wheel configuration, is mounted upon the drive shaft 33 of a motor 34 supported by a motor bracket 35 upon the table 11.

The stylus 19 is arranged for movement along a path which is parallel to the axis of the shaft 12. A guide, generally designated as 39, guides the up and down movement of the stylus, which in turn causes opposite up and down movement of the opposite end of the lever to thereby move the key blank towards and away from the cutter wheel. The guide includes guide walls 40 which make up a channel 41 having a base 42 which is extended outwardly of the channel walls. As illustrated in FIG. 4, relatively thick, side spacer plates 43 are arranged within the channel adjacent to the side walls thereof.

A number of guide blades 45, each having stepped upper edges 46, are arranged within the channel. The number of blades and the number of steps formed in each blade, are pre-determined by the configuration of the key to be duplicated. That is, if a standard automobile ignition key is provided with four positions, each of which may be a valley of a pre-determined depth, with the number of depths being selected from one of five dimensions, then four blades may be used, i.e., each corresponding to a location, and each blade is provided with four steps plus the upper edge, giving a total of five depths from zero to the fifth deepest depth.

The blades are spaced apart by thin, spacer shims 47 which may be made of metal or a suitable plastic.

The guide walls 40 of the channel are provided with horizontally axised holes 48. Similar holes 49 in the side spacer plates 43 are aligned with the holes 48. However, the blades are each provided with elongated slots 50 and the shims are provided with holes 51. Thus, the shank 52 of a fastener bolt 53 is inserted through the aligned holes 48, 49 and 51 and the slot 50, with the bolt 53 locked in position by means of a suitable nut, such as a thumb nut 54 for tightening and loosening.

Each blade has its end cut away or rabbitted at 55 with a notch 56 formed in the end. Thus, each blade may be grasped by means of a screw driver or knife blade or key inserted within the notch 56 for moving the blade longitudinally when the thumb nut 54 is loosened. Each blade is then aligned with one of a number of marks 57 etched or otherwise formed upon the base 42 of the guide channel. For example, FIG. 5 shows four numbered marks or lines so that the blades may be moved endwise forwardly or rearwardly into alignment with one or another of the marks to thereby position their steps in pre-determined locations, that is, beneath the path of movement of the stylus.

The guide is fixed in position upon the table 11 by means of edge flanges 58 formed on the channel base 42 for locating between guide strips 59 which are fastened by screws 60 to the table. A pivoted lock lever or bar 61, fastened by a pivot screw 62 to the strips 59, may be manually pivoted into overlapping relationship relative to the guide edge flanges 58 for locking the guide in position. Manual movement of the locking lever permits removal of the guide.

The guide described above functions to reconstruct or simulate the configured edge of a known original key, in the absence of the key. That is, by knowing a key code number, such as that used on automotive ignition keys, the key maker may look up the code in his manual and adjust the blades to correspond to the code required depths of cut. Once the blades are suitably adjusted so as to form a path, i.e., as indicated by the dotted line 63. The stylus moves along the path, up and down relative to the steps, as the stylus crosses each of the blades.

The user may stock different sets of blades, as for example, the number and step size corresponding to automobiles produced by each of the major automobile companies as well as other types of keys. Alternatively, the user may have a specialized collection of blades, as for example those corresponding to the locks for hotel rooms in a large hotel, etc. The number of blades may be varied, depending upon the number of configuration locations on the key, as for example, five or six blades to correspond to five or six cut locations, etc.

As an alternative, where the original key is available for duplication, an alternative vise may be used to replace the guide. Such vise, illustrated in FIGS. 8 and 9, and designated as 64, is adapted to clamp a pre-made key 65 between a fixed jaw 66 and a movable jaw 67. The two jaws are clamped together and released by means of a suitable thumb screw 68 which extends into the base of the vise. Flanges 70 formed on the opposite sides of the base permit the vise to be positioned between the strips 59 on the table and secured in place by means of the locking levers 61.

The location of the original key within the vise may be controlled by means of a stop plate 71 having an arm 72 with a bent stop edge 73 fitting into the gap between the two jaws to stop the inward movement of the key relative to the jaws. The stop plate may be fastened by means of a screw 74 extending through a slot 75 in the plate, and into a hole 76 formed in the upper surface of the vise. A similar stop may be provided on the vise formed on the opposite end of the lever, as illustrated in FIG. 1. Thus, the blank is likewise stopped in the same position, relatively, as is the original key. Here, movement of the stylus along the upper surface of the original key causes the lever 15 to rock up and down as it longitudinally moves along the shaft 12 to thereby move the blank edge relative to the cutter wheel 32 for duplicating the configuration upon the blank edge.

Figure 3:
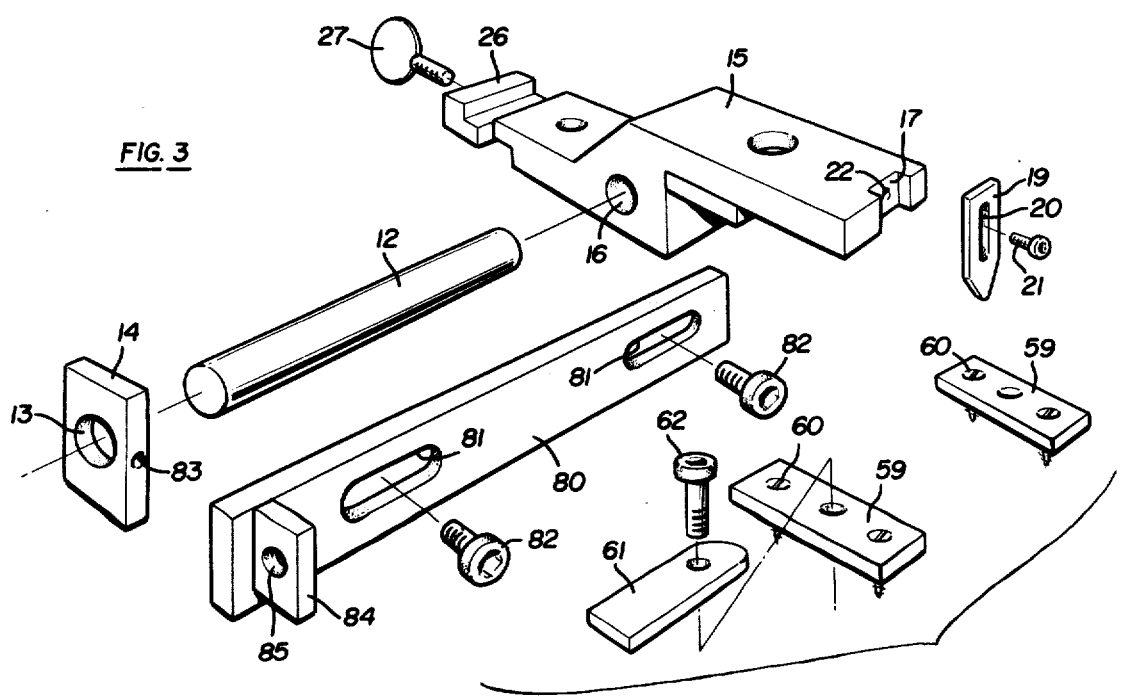
FIG. 3 is a perspective view of a number of the parts, shown in disassembled relationship.

The lever 15 may be moved longitudinally upon the shaft 12 by simply grasping it manually and physically moving it. However, preferably a means is provided for performing that function with less force required. As illustrated in FIGS. 1 and 3, that moving means comprises a flat, elongated bar 80 having elongated slots 81 through which screws 82 fit to threadedly engage into threaded screw holes 83 formed in the sides of the shaft brackets 14. The screws 82 are loose so that the bar 80 may be moved endwise upon the screws, guided by the screws co-acting with the slots 81.

At one end of the bar an ear or transverse plate 84 is fastened and a threaded opening 85 is centrally formed in this ear. Extending through the threaded opening is a manual drive screw 86 whose opposite end extends through a threaded opening in the vertical leg 87 of an angle bracket 88 fastened by screws 89 to the upper surface of the table. A handle or crank 90 is fastened on the free end of the screw 86. Thus, turning the crank or handle 90 causes the screw 86 to rotate, thereby causing the bar 80 to move longitudinally relative to the shaft 12.

Figure 2:
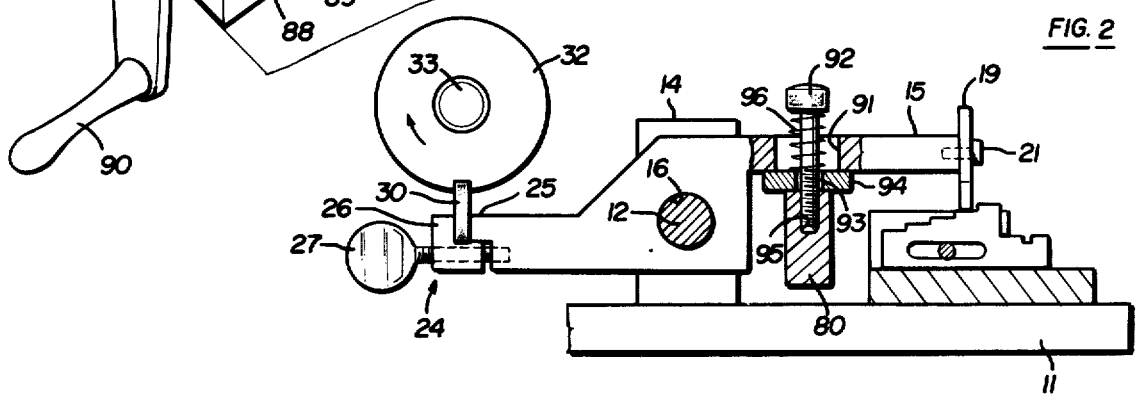
FIG. 2 is an elevational view, partially in cross-section, of the lever portion of the machine.

The lever 15 is provided with an oversized hole 91 in the lever portion near the stylus 19, as illustrated in FIG. 2. Extending through that opening is a screw 92 which extends loosely through a hole 93 formed in a pad or bottom plate 95. This pad or plate is fixed, as by screws, to the bottom of the lever 15. The free end of the screw 92 extends into a threaded hole 95 in the bar 80. A coil spring surrounds the upper end of the shank of the screw, between the head of the screw and the pad or plate 94.

In operation, the rotation of the crank 90 causes the bar 80 to move, thereby moving the screw 92, the pad 94 and the lever 15 to which the pad is connected. Meanwhile, the lever can pivot up and down about the axis of the shaft against the spring loading of the coil spring 96.

Preferably the pad 94 is fastened in place with screws so that it may be replaced by different thickness pads to accommodate different sizes of keys.

The movement of the bar 80 and the lever 15 may be accomplished by means of an electric motor drive. For example, the drive screw 86 could be connected to either a separate electric motor or through a gear train to the motor 34 for thereby automatically moving the lever 15.

As can be seen, the machine described herein lends itself for use in rapidly replacing lost or unavailable keys, merely by knowing the code number identification of the original key. By following the code, the key maker can appropriately position the stepped blades to guide the stylus and thereby the key blank into cutting relationship with the cutter wheel. Alternatively the same machine can be used to duplicate keys that are on hand. Thus, the machine can be easily used with unskilled labor and because of its relatively small size, simplicity and inexpensive construction, it may be kept available as a tool to be used when needed in various types of businesses where replacement keys are necessary from time to time, such as car rental agencies, hotels, repair shops, etc.

Having fully described an operative embodiment of this invention, I hereby claim:

1. A key duplicating machine for cutting the shaped edge on a key blank, comprising:

a support base means upon which is mounted a horizontally arranged, fixed shaft;

a lever having a central opening through which said shaft is journalled, with the lever being pivotable about the shaft axis and slidable longitudinally of the shaft axis;

a stylus mounted upon one end of the lever;

and an upwardly opening key blank vise mounted upon the opposite end of the lever, with said vise including means for temporarily clamping a key blank with its edge arranged parallel to the shaft axis;

mounting means supporting a fixed location, horizontally axised, rotating cutting wheel arranged in a plane transverse to the shaft axis and at a short distance above the vise;

guide means mounted upon said support base means and located adjacent the stylus, and having a shaped stylus contacted guide surface corresponding to a pre-determined key edge configuration;

said guide means comprising a number of similar, flat, guide blades clamped together in face to face relationship, with each having an exposed guide edge formed with a number of steps, each step corresponding to a pre-determined depth of cut on the key blank shaped edge;

said blanks being arranged with each blank having one of its steps selected in side by side alignment with the selected steps of the other blades to form said guide surface, with said guide surface being aligned with the stylus and parallel to the shaft axis;

releasable clamping means for clamping the blades together so that the guide surface may be changed in configuration by unclamping the blades and relatively moving each of them to utilize different steps thereof to form said guide surface;

whereby said lever may be slid longitudinally of the shaft while the stylus contacts the guide surface to rock the lever about the shaft axis, to thereby move the key blank edge longitudinally beneath and towards and away from the wheel for thereby cutting the shaped edge on the key blank, and whereby different shapes may be cut upon key blank edges by pre-selecting the positions of each of the blades.

2. A key making machine as defined in claim 1 above, and including spring means biasing said lever in one direction, namely wherein the stylus is spring urged into contact with the guide surface and correspondingly the key blank edge is resiliently biased into contact with the cutting wheel.

3. A key making machine as defined in claim 1, and said releasable clamping means including a channel shaped holder and means removably fastening the holder to said support base means, beneath the stylus end of the lever;

with the blades positioned within the holder and resting upon the base of the channel shaped holder on their edges which are located opposite the stepped edges so that each of the stepped edges are located at the open end of the channel and in alignment with each other, wherein the blades may be slid longitudinally of the channel for positioning their respective steps as desired.

4. A key making machine as defined in claim 3, and including a second key clamping means for temporarily holding a finished key, with said means being replaceably mountable adjacent the stylus in place of the channel shaped clamp for thereby utilizing an actual key instead of the blades for cutting a key blank edge.

* * * * *